US012664689B2

(12) United States Patent
Marano et al.

(10) Patent No.: US 12,664,689 B2
(45) Date of Patent: Jun. 23, 2026

(54) METHOD AND A SYSTEM FOR CALIBRATING A CAMERA

(71) Applicant: ABB Schweiz AG, Baden (CH)

(72) Inventors: Stefano Marano, Zurich (CH); Deran Maas, Zurich (CH); Bruno Arsenali, Brugg (CH); Yunke Ao, Zurich (CH)

(73) Assignee: ABB Schweiz AG, Baden (CH)

(*) Notice: Subject to any disclaimer, the term of this patent is extended or adjusted under 35 U.S.C. 154(b) by 0 days.

(21) Appl. No.: 19/098,113

(22) Filed: Apr. 2, 2025

(65) Prior Publication Data

US 2025/0285333 A1 Sep. 11, 2025

Related U.S. Application Data

(63) Continuation of application No. PCT/EP2023/075644, filed on Sep. 18, 2023.

(30) Foreign Application Priority Data

Oct. 6, 2022 (EP) ..................................... 22200130

(51) Int. Cl.
G06T 7/80 (2017.01)
G06T 7/73 (2017.01)

(52) U.S. Cl.
CPC .................. G06T 7/80 (2017.01); G06T 7/74 (2017.01); *G06T 2207/10004* (2013.01); *G06T 2207/10028* (2013.01); *G06T 2207/30252* (2013.01)

(58) Field of Classification Search
CPC ....................................................... G06T 7/80
See application file for complete search history.

(56) References Cited

U.S. PATENT DOCUMENTS 7,949,150 B2 * 5/2011 Haering ..................... G06T 7/80
348/169
2020/0394813 A1 12/2020 Theverapperuma et al.
(Continued)

FOREIGN PATENT DOCUMENTS

JP 2020-036202 A 3/2020
WO 2019/130940 A1 7/2019
WO 2019/239460 A1 12/2019

OTHER PUBLICATIONS

Japanese Office Action for Application No. 2025-517163, dated Feb. 3, 2026, 3 pages.

(Continued)

*Primary Examiner* — Michael H Hong
(74) *Attorney, Agent, or Firm* — McCarter & English, LLP

(57) ABSTRACT

A method and system for calibrating a camera which is arranged on an ego vessel are disclosed. The method comprises receiving image data captured by the camera, the image showing at least one imaged solid object and at least one imaged solid object interface between the imaged solid object and the imaged sky, or between the imaged solid object and an imaged water surface of a waterbody. The method further comprises extracting the imaged solid object interface from the image and determining a pose of the ego vessel at the time at which the image is captured. The method additionally comprises extracting a real solid object interface from received reference data. Furthermore, the method comprises determining a difference between the extracted imaged solid object interface and the extracted real solid object interface, and determining calibration values for the camera depending on the difference such that the difference is reduced.

16 Claims, 3 Drawing Sheets

(56) References Cited

U.S. PATENT DOCUMENTS

| | | |
|---|---|---|
| 2021/0261226 A1 | 8/2021 | Johnson |
| 2022/0172464 A1* | 6/2022 | Ross .................... G05D 1/0044 |

OTHER PUBLICATIONS

Hartley et al., Multiple View Geometry in computer vision. Cambridge University Press, New York. 673 pages, (2003).

Lin et al., Maritime Environment Perception Based on Deep Learning. IEEE Transactions on Intelligent Transportation Systems. Sep. 2022;23(9):15487-15497.

Palmieri et al., Harbour Surveillance with Cameras Calibrated with AIS Data. IEEE Aeropsace Conference Proceedings. Mar. 2013;9 pages.

International Search Report and Written Opinion for Application No. PCT/EP2023/075644, dated Dec. 15, 2023, 13 pages.

* cited by examiner

METHOD AND A SYSTEM FOR CALIBRATING A CAMERA

CROSS REFERENCE TO RELATED APPLICATIONS

The present application is a continuation of, and claims priority to, International Patent Application No. PCT/EP2023/075644, filed on Sep. 18, 2023, and titled "METHOD AND A SYSTEM FOR CALIBRATING A CAMERA", which claims priority to European Patent Application No. 22200130.7 filed on Oct. 6, 2022, and titled "METHOD AND A SYSTEM FOR CALIBRATING A CAMERA", which are hereby incorporated by reference in their entirety.

TECHNICAL FIELD

The present disclosure relates to the field of camera calibration. In particular, the present disclosure relates to a method and a system for calibrating a camera which is arranged on an ego vessel, wherein the camera may be used for target detection, e.g. based on monocular vision.

BACKGROUND

Camera calibration is a well-established process used to estimate intrinsic and extrinsic parameters, and optionally a lens distortion, of a camera. The former parameters define internal characteristics, e.g., an optical center, a focal length, a skew, and/or a distortion, of the camera while the latter parameters define a position and an orientation of the camera in the real world. For many applications, e.g., for navigation purposes, it is essential to know these parameters, as they may contribute to defining a mapping between the real world and an image coordinate system of the camera which may be used for the navigation. For example, when the camera is arranged on an ego vessel sailing on a waterbody, this mapping may be used to estimate a range and a bearing of another vessel on the same waterbody.

Manual camera calibration is a time consuming and labor-intensive process. In addition, maintaining calibration between multiple cameras is a daunting task as a slight change in the position of a camera requires the calibration process to be repeated. Although not as accurate as manual calibration, automatic calibration is a desirable alternative as it does not suffer from the same problems.

Automatic Identification System (AIS) is currently used by a considerable number of vessels. Besides a unique identifier, this system transmits other vessel-related information such as geo-position, course over ground, and speed over ground.

It is described in "Harbour surveillance with cameras calibrated with AIS data" from Palmieri F. A., Castaldo F. and Marino G., March 2013, in 2013 IEEE Aerospace Conference (pp. 1-8), IEEE, how to use the corresponding geo-position information for camera calibration. However, there are two problems with the current prior art: It does not take into account the extent of the other vessel and it does not take into the account that the position of the GPS receiver on the other vessel may not be provided or is not accurate. Therefore, there is a need for more accurate methods for calibrating the camera.

For other applications, e.g., for determining positions of objects on a water surface, e.g. of another vessel, using monocular vision, a calibrated camera is needed also. A known procedure is to compute a ray or line in the real world that corresponds to a given point in an image captured by the camera. To compute this line, the camera calibration, which contains the intrinsic, the extrinsic parameters and the lens distortion, has to be known. The intrinsic parameters, e.g. focal lengths and principal points, and characteristic of lens distortion may be obtained before an installation of the camera on the ego vessel, using a known camera calibration procedure with a checkerboard pattern. More difficult is to obtain the extrinsic parameters of the camera, which describe the position and orientation of the camera on the ego vessel. The orientation is challenging because an accuracy in the order of a tenth of a degree is needed. The position is also challenging due the practical difficulty of accurate measurement on the vessel structures. A corresponding automatic calibration is desired, because the manual calibration is time consuming, the accuracy depends on an experience of the person calibrating the camera, and there might be drifts, and an imprecise calibration leads to a decreased performance of the overall system.

A state-of-the-art method to get at least a subset of the extrinsic parameters, i.e. the pitch and the roll for a known camera height, is to automatically detect the horizon on open sea, basically the water-sky boundary on an image captured by the camera to be calibrated. However, there are several disadvantages with this method. First, with this method, the position of the camera cannot be calibrated, only roll and pitch angels of the camera may be calibrated. Second, for this method to work, a clear view of the horizon (water-sky boundary) is needed. If the horizon is for example a land-sky boundary, the camera cannot be calibrated, because an elevation of the land is not known.

BRIEF DESCRIPTION

It is an objective of the present disclosure to provide a method for calibrating a camera arranged on an ego vessel, which is very accurate and/or which may be carried out in a cost-efficient way, in particular automatically.

It is another objective of the present disclosure to provide a system for calibrating a camera arranged on an ego vessel, which is very accurate and/or which works in a cost-efficient way, in particular automatically.

These objectives are achieved by the subject-matter of the independent claims. Further exemplary embodiments are evident from the dependent claims and the following description.

An objective is achieved by a method for calibrating a camera which is arranged on an ego vessel. The method comprises: receiving image data of an image captured by the camera, the image showing at least one imaged solid object and at least one imaged solid object interface between the imaged solid object and the imaged sky, or between the imaged solid object and an imaged water surface of a waterbody, on which the ego vessel sails; extracting the imaged solid object interface from the image; determining a pose of the ego vessel at the time at which the image is captured; receiving reference data, the reference data being representative of at least one real solid object interface in the real world corresponding to the imaged solid object interface in the image, wherein the real solid object interface is between the corresponding real solid object and the real sky or, respectively, between the corresponding real solid object and the corresponding real water surface of the waterbody; extracting the real solid object interface from the reference data; determining a difference between the extracted imaged solid object interface and the extracted real solid object interface under consideration of the determined pose of the ego vessel; and determining calibration values for the camera depending on the difference such that the difference is reduced, e.g., minimized.

Comparing a real solid object and in particular a real interface between the real solid object and the real water surface and/or between the real solid object and the real sky with an imaged representation of the solid object, i.e., the imaged solid object, and in particular of the solid object interface, i.e., the imaged solid object interface, for the camera calibration enables to calibrate the camera automatically and thereby cost-efficient, and accurately, even if the horizon, i.e. the water-sky boundary is not visible. "Imaged" may mean in the present description that the corresponding subject is shown in the image, whereas "real" may mean in the present description that the corresponding subject is in the real world.

The image data may be received by the entity carrying out the above method. The entity may be a general-purpose computer, e.g. on the ego vessel, or a system for calibrating the camera which is arranged on an ego vessel. The water-body may be a lake, an ocean, a sea, or a river. The calibration values may be extrinsic calibration values, intrinsic calibration values, and/or distortion parameters, e.g. a lens distortion of the camera. The calibration values may comprise a position of the camera on the ego vessel and/or an orientation of the camera with respect to a vessel coordinate system of the ego vessel. The camera position may correspond to a position of a center of the camera. The camera center may be given by a pinhole of the camera. The calibration values may be represented by a vector θ. The orientation of the camera may comprise a yaw, pitch, and roll. The pose of the ego vessel may be determined by an ego positioning system of the ego vessel. The determining of the pose of the ego vessel may comprise a receiving of pose data, which are representative of the pose of the ego vessel, from the ego positioning system. The pose may comprise a position, a yaw, a pitch, roll, and/or a draft of the ego vessel. The pose may be determined by GPS, a compass, and/or IMU data. The imaged solid object interface may be extracted by image processing techniques and/or a neural network, e.g. as described in the not yet published patent application EP 22 180 131.9. The real solid object interface may be extracted by image projection techniques and/or by coordinate transformation of the corresponding reference data.

The difference may be any mathematical concept appropriate for describing or defining a deviation of the imaged solid object interface and the real solid object interface. In particular, the difference between the imaged solid object interface seen in the image and the projection of the real solid object interface on the image may be computed. For example, the difference may be given by one or more distances of one or more points along the imaged solid object interface and the corresponding points along the real solid object interface projected on the image.

In general, an interface between the solid object and the water surface, or between the solid object and the sky may be a physical or a non-physical interface. The physical interface exists in the real world, whereas the non-physical interface exists in the image only, but not in the real world.

The solid object may be land or another vessel. In case of land as the solid object, the solid object interface may be a physical land-water interface between the water surface and the land, e.g., a coastline of the land, or a physical land-sky interface between the sky and the land, i.e., a skyline of the land. Alternatively, in case of land as the solid object, the solid object interface may be a non-physical land-water interface between the water surface and the land, e.g., an interface between the water surface and an elevation of the land above the coastline. In case of another vessel as the solid object, the solid object interface may be a physical vessel-water interface between the water surface and the other vessel, e.g., a waterline of the other vessel, or a physical vessel-sky interface between the sky and the other vessel, i.e., a skyline of the other vessel. Alternatively, in case of the other vessel as the solid object, the solid object interface may be a non-physical vessel-water interface between the water surface and a part of the other vessel above the waterline of the other vessel. This may be valid for the imaged solid object interface as well as for the real solid object interface.

The real solid object interface is also a 2D line as the imaged solid object interface. In particular, the interface between the imaged solid object and the imaged water surface or between the imaged solid object and the imaged sky is always a 2D line within the 2D image of the camera, whereas the interface between the real solid object and the real water surface is always a 3D line and the interface between the real solid object and the real sky is always a 3D surface in the real world. However, for the present disclosure and in the present description, only that part of the 3D line or, respectively, the 3D surface in the real world is used, which corresponds to the 2D imaged solid object interface. Therefore, for the present disclosure, the real solid object interface is also a 2D line, e.g., a coastline, waterline, or skyline, just as the corresponding imaged solid object interface.

The above method may be carried out several times. For example, the above method may be carried out as a loop. The calibration loop may comprise an optimization algorithm, e.g. a non-linear optimization algorithm. The above method, i.e. the loop, may be carried out until a predetermined condition is fulfilled, e.g., until the difference is smaller than a predetermined difference threshold. When the method is carried out for the first time, predetermined calibration values may be received from a memory of a system for calibrating the camera and may be adjusted in order to determine the calibration values for the camera. In this case, the predetermined calibration values may be stored in the memory in advance, e.g. as fixed starting values, e.g. by a manufacturer of the system. Alternatively, "best guess" calibration values or the calibration values determined from the last calibration may be used as a starting point when carrying out the above method for the first time. When the method is carried out for the second or further times during one calibration, the predetermined calibration values may be the adjusted calibration values from the previous loop. So, the above method may provide a calibration loop for adjusting the calibration values.

According to an embodiment, the extracting of the imaged solid object interface from the image comprises extracting a pathway of the imaged solid object interface within the image; the extracting of the real solid object interface from the reference data comprises extracting a pathway of the real solid object interface in the real world; and the difference between the imaged solid object interface and the real solid object interface corresponds to a difference between the extracted pathway of the imaged solid object interface and the extracted pathway of the real solid object interface. The extracted pathway of the imaged solid object interface may include a form and a position of the imaged solid object interface within the image, in particular the coordinates of the corresponding pixels within the image. The extracted pathway of the real solid object interface may include a form and a position of the real solid object interface within the real world, in particular the coordinates of the corresponding pixels within the real world.

According to an embodiment, the determining of the difference between the pathway of the imaged solid object interface and the pathway of the real solid object interface comprises transferring the pathway of the imaged solid object interface and/or the pathway of the real solid object interface into the same coordinate system, and determining a misfit function between the imaged solid object interface and the real solid object interface within the coordinate system as the difference; and the determining of the calibration values of the camera such that the difference is reduced comprises determining the calibration values such that the misfit function is reduced, e.g. minimized. Alternatively, a cost function may be used instead of the misfit function. The "same" coordinate system may be the real world coordinate system given by the reference data, the image coordinate system given by the camera and the image, or another coordinate system used for determining the difference only.

According to an embodiment, the predetermined calibration values are varied such that the misfit function is minimized. In case of the usage of the cost function, the difference may be reduced by reducing, e.g., minimizing, the costs of the cost function.

According to an embodiment, when extracting the real solid object interface from the reference data, only those parts of the real solid object interface which are visible from the camera are extracted; and the determining of the difference between the imaged solid object interface and the real solid object interface comprises determining the difference between the imaged solid object interface with the determined visible parts of the real solid object interface only. The real solid object may comprise a real solid object interface to the water surface or to the sky which is not visible from the camera. Therefore, the image may not contain an imaged solid object interface corresponding to that real solid object interface. Determining those parts of the real solid object interface which are visible from the camera and determining the difference between the imaged solid object interface with the determined visible parts of the real solid object interface only may contribute to solve this issue.

According to an embodiment, the method comprises determining a positional relationship between the camera and the real solid object interface from the reference data; and determining the parts of the real solid object interface which are visible from the camera depending on the determined positional relationship. The positional relationship may be determined by transferring a position of the camera and the real solid object interface into the same coordinate system, e.g. a 2D coordinate system. For example, the reference data may comprise 2D data, e.g. a 2D map data, or 3D data, e.g. 3D map data, which are transferred into the 2D data, e.g. the 2D map data, and the position of the camera may be transferred into the corresponding 2D map. Then, the positional relationship may be extractable and/or visible from the 2D map comprising a representation of the real solid object interface and the position of the camera. The positional relationship may be defined by one or more distances between the position of the camera and one or more points along the representation of the real solid object interface within the corresponding 2D map.

According to an embodiment, the reference data comprise 2D map data representing a 2D map of surroundings of the ego vessel. The 2D map data may comprise 2D coordinates of one or more land polygons corresponding to one or more coastlines at the waterbody. The 2D map data may be obtain from digital electronic maps, e.g. OpenStreetMap.

According to an embodiment, the parts of the real solid object interface which are visible from the camera are determined from the 2D map data depending on the determined positional relationship between the camera and the real solid object interface by ray casting. The ray casting may be a 2D uniform ray casting. The ray casting may contribute to determine the parts of the real solid object interface which are visible from the camera in an easy and/or accurate manner.

According to an embodiment, the reference data comprise AIS data. The AIS data may comprise vessel-related information about one or more other vessels which are close to the ego vessel. In particular, the AIS data may relate to at least one other vessel in the waterbody, wherein the other vessel may be used as the real solid object. The vessel-related information may comprise a unique identifier, a geo-position, a course over ground, and a speed over ground of the other vessel. Further, the AIS data may comprise an extent of the other vessel in relation to a geo-location of its GPS receiver. This enables to take the extent of the other vessel in relation to the geo-location of its GPS receiver into account when using the corresponding real solid object interface, i.e., the vessel-water interface between the other vessel and the water surface, for determining the calibration values.

According to an embodiment, the AIS data comprise the geo-location of the GPS receiver of the other vessel and an extent of the other vessel in relation to the geo-location of the GPS receiver of the other vessel; a real vessel-water interface between the real water surface and the other vessel is estimated from the extent and the geo-location of the GPS receiver of the other vessel; the parts of the real vessel-water interface which are visible from the camera are determined depending on the estimated real vessel-water interface and a position of the camera; and the visible parts of the real vessel-water interface are used as the real solid object interface for being compared to the corresponding imaged solid object interface. This contributes to a very accurate determination of the calibration values. The real vessel-water interface may be determined by constructing a bounding box in which the other vessel fits, e.g. perfectly fits, depending on the extent of the other vessel and by constructing an ellipse which fits, e.g. perfectly fits, into the bounding box, wherein the ellipse is transferred into the real-world coordinate system and is used as the real vessel-water interface. Similarly, other geometrical shapes that model more accurately the outline of the vessel may be used beside the ellipse.

According to an embodiment, the reference data comprise elevation map data of the real land surrounding the waterbody. This enables to determine the real solid object interface, in particular the real land-sky interface. The elevation map data may be representative of a 3D map and/or topography of the land and may be referred to as Digital Elevation Model (DEM) as it is known in the art.

According to an embodiment, the parts of the real solid object interface which are visible from the camera are determined from the elevation map data by generating a textureless rendered image and by extracting the parts from the textureless rendered image. The textureless rendered image may be generated as a synthetic view of the land surrounding the waterbody and/or by a renderer under consideration of the predetermined calibration values and the pose of the ego vessel. The textureless rendered image may comprise the sky, the land, and the water surface in distinct colors. Then, the visible parts may be extracted by image processing as it is known in the art.

According to an embodiment, the calibration values are adjusted until a predetermined condition is fulfilled. In other words, the method may be repeatedly carried out until the predetermined condition is fulfilled. For each loop of the method, a new image may be captured by the camera and received by the system for calibrating the camera, a new imaged solid object interface may be extracted from the image, and a corresponding new real solid object interface may be extracted from the reference data. The predetermined condition may be that the difference is smaller than a predetermined difference threshold.

According to an embodiment, the calibration values are determined by adjusting predetermined calibration values of the camera such that the difference is reduced, e.g. minimized. The predetermined calibration values may be stored on a memory of the system for calibrating the camera. The predetermined calibration values may be known by a manufacturer of the system or may be derived from camera specifications of the camera, and may be stored on the memory. This may be advantageous when the method is carried out for the first time. Alternatively or additionally, the predetermined calibration values may be the final calibration values determined by the last calibration of the camera. This may be advantageous when the method has already been carried out one or more times.

An objective is achieved by the system for calibrating the camera which is arranged on the ego vessel. The system comprises the memory configured for storing the reference data and/or the calibration values, e.g., the predetermined calibration values, and a processing unit which is configured for carrying out the above method. Further, the system may comprise the camera or may be a part of the camera. Furthermore, the system may comprise means for receiving the reference data, e.g., via radio and/or satellite communication.

It has to be understood that features of the method for calibrating the camera, which is arranged on an ego vessel, as described in the above and in the following, may be features of the system for calibrating the camera which is arranged on the ego vessel as described in the above and in the following.

These and other aspects of the present disclosure will be apparent from and elucidated with reference to the embodiments described hereinafter.

BRIEF DESCRIPTION OF DRAWINGS

The subject matter of the present disclosure will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
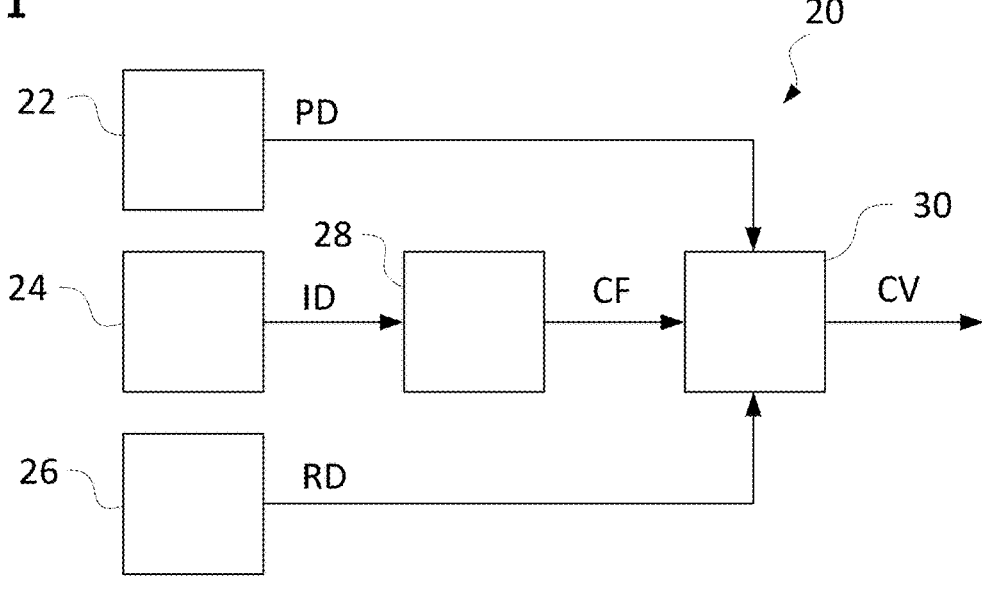
FIG. 1 shows a block diagram illustrating an exemplary embodiment of a system for calibrating a camera which is arranged on an ego vessel.
Figure 6:
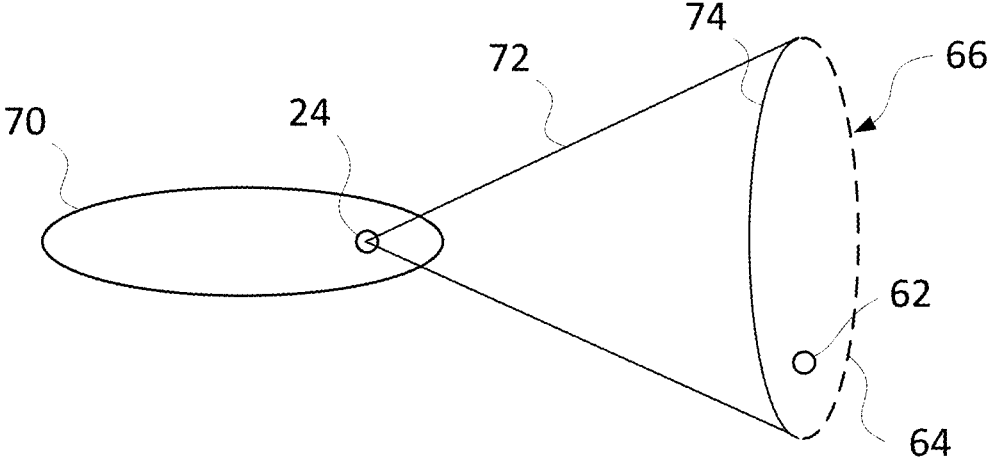
FIG. 6 illustrates a principle for determining parts of the estimated vessel-water interface which are visible from the camera.

FIG. 1 shows a block diagram illustrating an exemplary embodiment of a system for calibrating a camera 24 which is arranged on an ego vessel 70 (see FIG. 6). The system may comprise a positioning device 22 for determining position data PD of the ego vessel 70, the camera 24 for generating image data ID of an image 40 (see FIG. 3), an acquisition component 26 for acquiring reference data RD, an extracting component 28 for extracting calibration features CF from the image data ID, and a calibration loop 30 for determining calibration values CV for calibrating the camera 24 depending on the position data PD, the calibration features CF, and the reference data RD. In addition, the system may comprise a memory (not shown) configured for storing the reference data RD and/or the calibration values CV, and a processing unit (not shown) which is configured for carrying out a method for calibrating the camera 24 which is arranged on the ego vessel 70, e.g., as described with respect to FIG. 2.

The camera 24 is configured for capturing one or more images 40 of surroundings of the ego vessel 70 and for generating the corresponding image data ID. The positioning device 22 is configured for determining a pose of the ego vessel 70 at the time at which the image 40 is captured and for generating the corresponding pose data PD. The extracting component 28 is configured for extracting the calibration features CF from the image data ID, i.e., at least one imaged solid object interface from the image 40. The acquisition component 26 may be configured for acquiring the reference data RD from the memory of the system or from an external source, e.g., via satellite, radio, and/or the internet. The acquisition component 26 may comprise another extracting component for extracting at least one real solid object interface from the reference data RD.

The reference data RD are representative of the at least one real solid object interface in the real world 80 (see FIG. 4) corresponding to the imaged solid object interface in the image 40, wherein the real solid object interface is between the corresponding real solid object and the real sky 94 or, respectively, between the corresponding real solid object and the corresponding real water surface 92 of the waterbody. The processing unit is configured for receiving the reference data RD, for determining a difference between the imaged solid object interface and the real solid object interface under consideration of the determined pose of the ego vessel 70, and for determining the calibration CF values for the camera 24 depending on the difference such that the difference is reduced, e.g. minimized.

Figure 2:
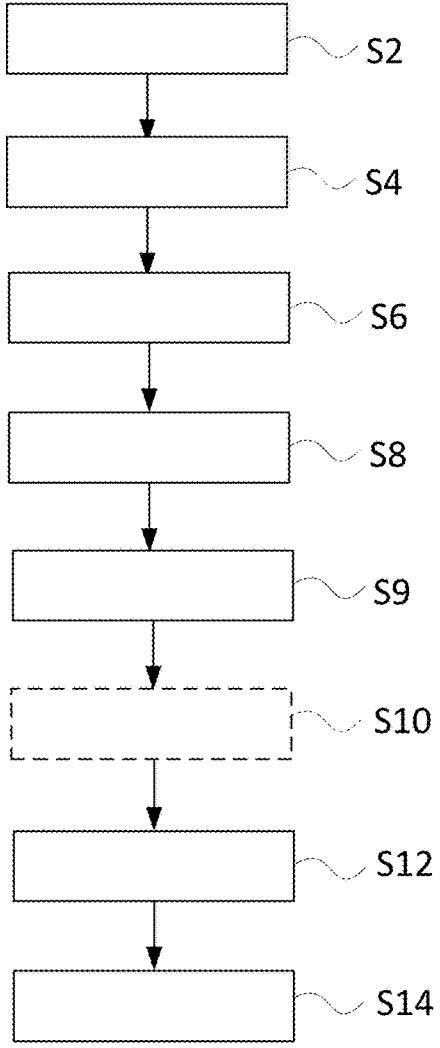
FIG. 2 shows a flow-chart of an exemplary embodiment of a method for calibrating the camera.

The function(s) and/or operation of the system is explained in the following in more detail with respect to the method carried out by the system, wherein the aspect of the method shown in FIG. 2 are explained with the help of FIGS. 3 to 6.

FIG. 2 shows a flow-chart of an exemplary embodiment of the method for calibrating the camera 24 which is arranged on the ego vessel 70. The ego vessel 70, on which the camera 24 is arranged, may sail on a waterbody. The waterbody may be a lake, an ocean, a sea, or a river.

In S2, the image data ID of the image 40 (see FIG. 2) captured by the camera 24 are received. The camera 24 may generate the image data ID representing the image 40. The image data ID may be sent to and/or may be received by the processing unit carrying out the method for calibrating the camera 24. The image data ID may be stored in the memory of the system for calibrating the camera 24, wherein the memory is coupled to the processing unit. When the method is carried out, the processing unit may receive the image data ID from the camera 24 directly or from the memory. The camera 24 may be calibrated by the above system and the method with respect to a position and/or orientation of the camera 24 relative to the ego vessel 70.

Figure 3:
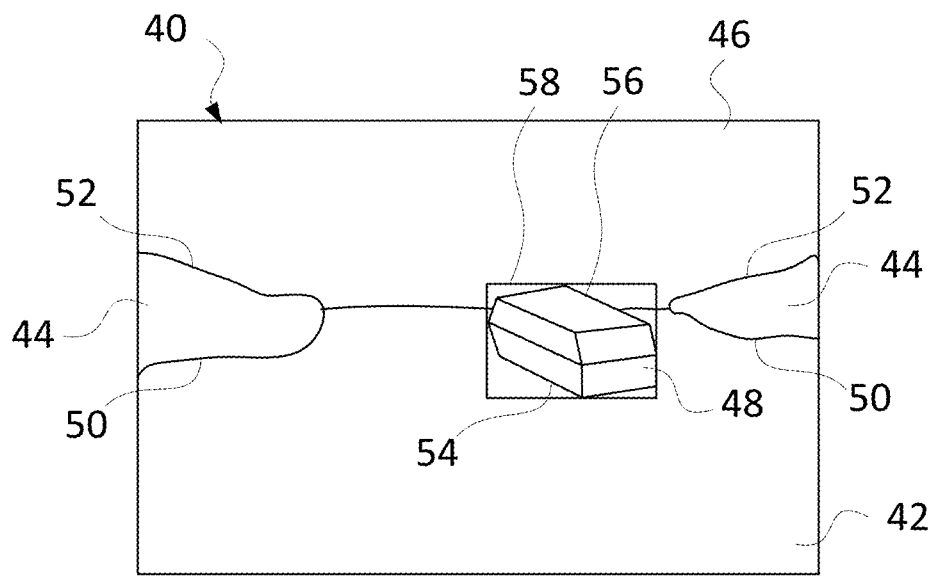
FIG. 3 shows an example of an image showing another vessel in a waterbody.

FIG. 3 shows an example of the image 40 showing an imaged other vessel 48, which may be seen from the ego vessel 70 and which may also sail on the waterbody. The waterbody may be represented within the image 40 by an imaged water surface 42 of the waterbody. The image 40 may show the imaged water surface 42, imaged land 44, e.g. two imaged spits of land, the imaged sky 46, the imaged other vessel 48, and an imaged bounding box 58 surrounding the imaged other vessel 48.

The image 40 may show at least one imaged solid object and at least one imaged solid object interface between the imaged solid object and the imaged sky 46, or between the imaged solid object and an imaged water surface 42 of the waterbody, on which the ego vessel 70 sails. For example, the imaged solid object may be the imaged land 44 or the imaged other vessel 48. In case of the imaged land 44 as the imaged solid object, the solid object interface may be an imaged land-water interface 50 between the imaged water surface 42 and the imaged land 44, i.e., an imaged coastline of the imaged land 44, or an imaged land-sky interface 52 between the imaged sky 46 and the imaged land 44, i.e., an imaged skyline of the imaged land 44. In case of the imaged other vessel 48 as the imaged solid object, the imaged solid object interface may be an imaged vessel-water interface 54 between the imaged water surface 42 and the imaged other vessel 48, i.e., an imaged waterline of the imaged other vessel 48, or an imaged vessel-sky interface 56 between the imaged sky 46 and the imaged other vessel 48, i.e., an imaged skyline of the imaged other vessel 48.

In S4, the imaged solid object interface, i.e., imaged land-water interface 50, the imaged land-sky interface 52, the imaged vessel-water interface 54, or the imaged vessel-sky interface 56, is extracted from the image 40, in particular from the image data ID, e.g., by the extracting component 28. The extracting of the imaged solid object interface from the image 40 may comprise extracting a pathway of the imaged solid object interface within the image 40. The pathway of the imaged solid object interface may include a form and a position of the imaged solid object interface within the image 40, wherein the image data ID may comprise the pixel coordinates of the corresponding pixels of the image 40. For extracting the imaged solid object interface, in particular the corresponding pixel coordinates, an imaged bounding box 58 may be determined and the pathway of the imaged solid object interface may be searched within the bounding box 58 only.

The extracting component 28 may comprise a first neural network which may receive the image data ID and which may be configured for extracting the imaged solid object interface from the image data ID. For example, if the imaged vessel-water interface 54 is extracted and used as the imaged solid object interface, the imaged solid object interface may be extracted from the image data ID by determining at least one vessel-water value for each pixel of the image 40 from the image data ID, wherein the vessel-water values may be representative for a probability of the corresponding pixel showing the imaged solid object, in this case the imaged other vessel 48, the imaged water surface 42, or the imaged sky 46. Then, the imaged vessel-water interface 54 may be determined from the vessel-water values by one or more post-processing aspect, e.g., by edge detection and/or thresholding of the vessel-water values.

The vessel-water values may be determined by semantic segmentation of the image 40. The semantic segmentation may be carried out by the first neural network which may have been trained on differentiating between solid objects, water surface, and sky in images, e.g. by supervised learning using correspondingly labelled images. For example, the first neural network may be trained in advance by supervised learning using an amount of images 40 showing imaged solid objects, e.g., other vessels 48 on waterbodies, and by the images 40 being labelled with respect to the corresponding imaged water surfaces 42, imaged skies 46, and imaged other vessels 48. In addition, images 40 not showing any solid objects may also be involved in the training of the first neural network.

A method for extracting a solid object interface, in particular a vessel-water interface, from an image which may be used in this context is known from and described in detail in the not yet published patent application EP 22 180 131.9. Although this patent application focuses on the extraction of the vessel-water interface only, the corresponding method may be easily expanded to the extraction of solid object interfaces in general by a person skilled in the art, e.g., by training the first neural network such that it is able to determine the other solid object interfaces, i.e., the imaged land-water interface 50, the imaged land-sky interface 52, or the imaged vessel-sky interface 56.

Turning to the method, in S6, the pose of the ego vessel 70 at the time at which the image 40 is captured is determined. The determining of the pose of the ego vessel 70 may comprise a receiving of the pose data PD, which are representative of the pose of the ego vessel 70, from the positioning device 22. The pose may comprise a position a yaw, a pitch, a roll, and/or a draft of the ego vessel 70.

In S8, the reference data RD are received. The reference data RD are representative of at least one real solid object interface in the real world 80 corresponding to the imaged solid object interface in the image 40. The reference data RD may comprise a pathway of the real solid object interface in the real world 80. The pathway of the real solid object interface may include a form and a position of the real solid object interface within the real world 80. For example, real world coordinates of the pathway of the real solid object interface may be encoded within the reference data RD.

In S9, the real solid object interface, in particular the pathway of the real solid object interface, is extracted from the reference data RD. The extracted real solid object interface, in particular the extracted pathway of the real solid object interface, basically corresponds to the calibration features CF, i.e., the corresponding imaged solid object interface, extracted from the image data except for the difference described below. The way of extracting the real solid object interface may depend on the kind of reference data RD which may be used. For example, if the reference data RD comprise a 2D map of the surroundings of the ego vessel 70, the real solid object interface may correspond to a coastline represented in the 2D map, and the real solid object interface may be extracted from the corresponding 2D map by simply extracting the corresponding coordinates from the 2D map. Alternatively, if the reference data RD comprise AIS data, e.g., as explained with respect to FIG. 5, the real solid object interface may correspond to a waterline of the corresponding other vessel 48, with the waterline being determined from the AIS data, as explained below.

Alternatively, if the reference data RD comprise elevation map data, e.g., as explained with respect to FIG. 4, the real solid object interface may correspond to a skyline of the corresponding land, or to a physical or non-physical water-land interface, as explained below.

Figure 4:
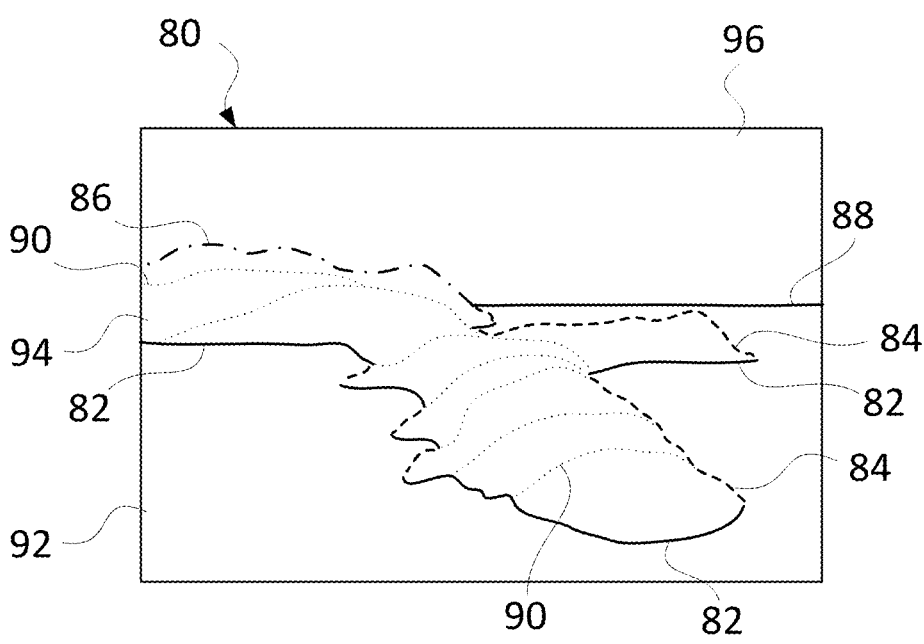
FIG. 4 shows an exemplary picture of the real world.

FIG. 4 shows an exemplary picture of the real world 80, e.g., given by the reference data RD, e.g., by an elevation map. The part of the real world 80 which is shown in the picture of FIG. 4 does not correspond to the part of the real world 80 shown in the image 40 and is shown in order to describe at least some of the real solid object interfaces usable for the present disclosure. In general, the real solid object interface is between the corresponding real solid object and the real sky 96 or, respectively, between the corresponding real solid object and the corresponding real water surface 92 of the waterbody. In this example, the real solid object may be real land 94 or the real other vessel (not shown in FIG. 4), e.g., corresponding to the imaged other vessel 48 (shown in FIG. 3). In case of the real land 94 as the real solid object, the real solid object interface may be a first real land-water interface 82 (continuous line) between the real water surface 92 and the real land 94, e.g., a real coastline of the real land 94 also referred to as physical land-water interface, or a second real land-water interface 84 (dashed line) between the real water surface 92 and the real land 94, e.g., a line between an elevation of the real land 94 and the real water surface 92 also referred to as non-physical land-water interface, because it is only a land-water interface when seen from the ego vessel 70 but not in the real world. Alternatively, the real solid object interface may be a real land-sky interface 86 (dashed-dotted line) between the real sky 96 and the real land 94, i.e., a real skyline of the real land 94. In case of the real other vessel as the real solid object, the real solid object interface may be a real vessel-water interface (not shown) between the real water surface 92 and the real other vessel, e.g., a real waterline of the real other vessel, or a real vessel-sky interface (not shown) between the real sky 96 and the real other vessel, i.e., a real skyline of the real other vessel.

In the current method, in optional S10, parts of the real solid object interface which are visible from the camera 24 may be determined. The real solid object, e.g., the real land 94, may comprise a real solid object interface to the real water surface 92 or to the real sky 96 which is not visible from the camera 24. Therefore, the image 40 may not contain and/or show an imaged solid object interface corresponding to that real solid object interface. For example, the first real land-water interface 82 comprises a part of the coastline of the real land 94 which is visible from the camera 24, but not a part of the coastline of the real land 94, which is covered by the elevation of the real land 94. Therefore, the first real land-water interface 82 is interrupted by the second real land-water interface 84. The second real land-water interface 84 does not comprise the coastline of the real land 94, but only a 2D line between the real water surface 92 and the elevation of the real land 94 as it is seen from the ego vessel 70. Further, only a part of the real skyline of the real land 94 may be visible from the camera 24, e.g., the real land-sky interface 86 as shown in FIG. 4. The parts of the real solid object interface which are visible from the ego vessel 70, in particular the camera 24, may be determined by ray casting as explained below with respect to FIG. 6.

In an optional aspect S12, which particularly may be carried out after the optional aspect S10 has been carried out, a positional relationship between the camera 24 and the real solid object interface may be determined from the reference data RD. In this case, the parts of the real solid object interface which are visible from the camera 24 may be determined depending on the determined positional relationship. The positional relationship may be determined by transferring the position of the camera 24 and the real solid object interface into the same coordinate system, e.g. a 2D coordinate system, by any appropriate coordinate transfer method known in the art. For example, the reference data RD may comprise 2D data, e.g. a 2D map data, or 3D data, e.g. 3D map data, which may be transferred into the 2D data, e.g. the 2D map data. Then, the position of the camera 24 may be transferred into the corresponding 2D map. Afterwards, the positional relationship may be extractable and/or visible from the 2D map comprising a representation of the real solid object interface and the position of the camera 24. The positional relationship may be defined by one or more distances between the position of the camera 24 and one or more points along the representation of the real solid object interface within the corresponding 2D map. So, the reference data RD may comprise 2D map data representing a 2D map of surroundings of the ego vessel 70, in particular of the camera 24. The 2D map data may comprise 2D coordinates of one or more land polygons corresponding to one or more coastlines at the waterbody. The 2D map data may be obtained from OpenStreetMap.

The 2D map data may also be used for extracting the real solid object interface, in particular the visible real solid object interface, from the corresponding 2D map. The extracted real solid object interface may be projected on the image 40.

Alternatively, the reference data RD may comprise AIS data. In general, the AIS data may comprise vessel-related information about one or more other vessels which are close to the ego vessel 70. In particular, the AIS data may comprise a geo-location of a GPS receiver 62 of a real other vessel 66 (see FIG. 5), corresponding to the imaged other vessel 48. The vessel-related information may comprise a unique identifier, a course over ground, and a speed over ground of the real other vessel 66, and the geo-location of the GPS receiver 62. Further, the AIS data may comprise an extent of the real other vessel 66 in relation to the geo-location of its GPS receiver 62.

Figure 5:
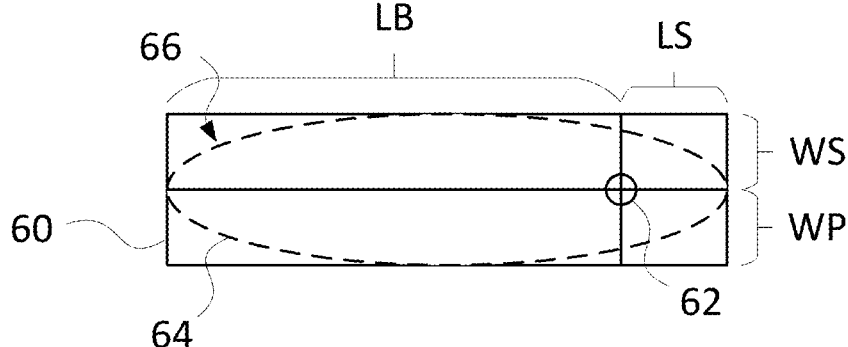
FIG. 5 shows an example of a visualization of a real vessel-water interface estimated from AIS data.

FIG. 5 shows an example of a visualization of a real vessel-water interface estimated from AIS data, i.e., an estimated real vessel-water interface 64. The extent of a corresponding real other vessel 66 may be given by a width to starboard WS, a width to port WP, a length to bow LB, and/or a length to stern LS, each related to the position of the GPS receiver 62. The estimated real vessel-water interface 64 may be determined by constructing an AIS bounding box 60 in which the real other vessel 66 fits, e.g. perfectly fits, depending on the extent of the real other vessel 66 and by constructing an ellipse which fits, e.g. perfectly fits, into the bounding box, wherein the ellipse may correspond to the estimated real vessel-water interface 64, may be transferred into the real-world coordinate system, and may be used as the real vessel-water interface. Alternatively, another form than the ellipse may be used to estimate the real vessel-water interface. Further, the shape extracted from the AIS data may be reinforced with corresponding information from a radar and/or lidar measurement.

So, the real vessel-water interface between the real water surface 92 and the real other vessel 66 may be estimated from the extent and the geo-location of the real other vessel 66 corresponding to the imaged other vessel 48. The parts of the real vessel-water interface which are visible from the camera 24 may be determined depending on the estimated real vessel-water interface 64 and the position of the camera 24. The real vessel-water interface 64, in particular the visible parts of the real vessel-water interface 64, may be projected on the image 40 and may be used for determining the difference between the imaged solid object interface and the real solid object interface.

Alternatively, the reference data RD may comprise elevation map data of the real land 94 surrounding the waterbody. The elevation map data may be representative of a 3D map and/or topography of the real land 94 and may be referred to as Digital Elevation Model (DEM) as it is known in the art. In this case, the parts of the real solid object interface which are visible from the camera 24 may be determined from the elevation map data by generating a textureless rendered image and by extracting the parts of the real solid object interface which are visible from the camera 24 from the textureless rendered image. The textureless rendered image may be generated as a synthetic view of the real land 94 surrounding the waterbody and/or by a renderer, e.g., under consideration of predetermined calibration values of the camera 24 and the pose of the ego vessel 70. The textureless rendered image may comprise representatives of the real sky 96, the real land 94, and the real water surface 92 with distinct properties, e.g., in distinct colors. Then, the visible parts of the real solid object interface which are visible from the camera 24 may be extracted by image processing as it is known in the art. The extracted real solid object interface, in particular the visible parts of the real solid object interface, may be projected onto the image 40 and may be used for determining the difference between the imaged solid object interface and the real solid object interface.

In S12, the difference between the imaged solid object interface and the real solid object interface is determined under consideration of the determined pose of the ego vessel 70. If the optional S10 has been carried out, a difference between the imaged solid object interface with the determined visible parts of the real solid object interface may be determined only. The difference may be any mathematical concept appropriate for describing or defining a deviation of the imaged solid object interface from the corresponding real solid object interface. In particular, the difference between the imaged solid object interface seen in the image 40 and the projection of the real solid object interface on the image 40 may be computed. For example, the difference may be given by one or more distances of one or more points along the imaged solid object interface, e.g., along the pathway of the imaged solid object interface, and the corresponding points along the real solid object interface projected on the image 40, e.g., along the pathway of the real solid object interface projected on the image 40. In general, the difference between the imaged solid object interface and the real solid object interface may correspond to a difference between the pathway of the imaged solid object interface and the pathway of the real solid object interface transferred into the same coordinate system, e.g., the image coordinate system. The determining of the difference between the pathway of the imaged solid object interface and the pathway of the real solid object interface may comprise transferring the pathway of the imaged solid object interface and/or the pathway of the real solid object interface into the same coordinate system and determining a misfit function between the imaged solid object interface and the real solid object interface within the coordinate system as the difference.

For example, the calibration features CF extracted from the image 40, i.e., the coordinates of one or more of the above solid object interfaces, may be given by $$\{z_j\}_{j=1}^{M}$$

with z representing coordinates of the points from which the imaged solid object interface is formed within the image 40, and with j and M each being natural numbers. Thus, the calibration features CF and the corresponding imaged solid object interface may be represented as sets of points.

Another set of points, which are represented in the world coordinates, may be obtained from a discretization of the visible parts of the real solid object interface given by the reference data RD as $$\{P_i\}_{i=1}^{N}$$

with P representing coordinates of the points at which the real solid object interface is formed within the real-world coordinate system, and with i and N each being natural numbers. Thus, the real solid object interface may also be represented as set of points.

Then, the distance from the closest calibration feature CF, i.e., the closest imaged solid object interface, to the corresponding extracted reference data RD, i.e., the corresponding real solid object interface, may be given by $$C_i(\theta) = \min_{j=1,2,\ldots,M} \|\pi(P_i, \theta) - z_j\|$$

with $\pi(\ )$ representing a projection function for transferring the real-world coordinates to image coordinates of the image 40, and with the calibration values CV being given as the vector $\theta$.

The vector $\theta$ may be defined by the following equation $$\begin{bmatrix} x \\ y \\ w \end{bmatrix} = \begin{bmatrix} f_x & s & c_x \\ 0 & f_y & c_y \\ 0 & 0 & 1 \end{bmatrix} \begin{bmatrix} r_{11} & r_{12} & r_{13} & t_x \\ r_{21} & r_{22} & r_{23} & t_y \\ r_{31} & r_{32} & r_{33} & t_z \end{bmatrix} \begin{bmatrix} X \\ Y \\ Z \\ 1 \end{bmatrix}$$

with (X, Y, Z) denoting a point in the real world coordinate system, (x, y, w) denoting the corresponding point in the image coordinate system (considering a homogeneous representation), wherein the point (u, v) in the image coordinate system may be obtained by u=x/w and v=y/w, with the extrinsic parameters being defined by ($t_x$, $t_y$, $t_z$) denoting a translation between the world coordinate system and the camera coordinate system, with $r_{mn}$ denoting parameters of a rotation between the aforementioned coordinate systems, with the intrinsic parameters being defined by ($f_x$, $f_y$) denoting the focal length and ($c_x$, $c_y$) denoting the optical center, and with s denoting the skew. For models that include lens distortion and details related to the aforementioned model, it is referred to "Multiple View Geometry in Computer Vision", second edition, by Richard Hartley and Andrew Zisserman, Cambridge University Press, March 2003, 978-0-521-54051-3.

It has to be mentioned in this context, that it is already known in the art how to project 3D points of the real world on the 2D image 40 using calibration values, e.g., from the preceding reference, i.e. "Multiple View Geometry in Computer Vision", wherein the projection of the real world point on the image for an ideal camera is explained in chapter 6, page 154, and how to correct for the lens distortion is explained in chapter 7, page 191.

In aspect S14, the calibration values CV for the camera 24 may be determined depending on the above difference such that the difference is reduced, e.g. minimized. For example, a misfit and/or cost function may be defined as $$C(\theta) = \sum_{i=1}^{N} (\min\{T, C_i(\theta)\})^m$$

with m being an exponent that could be tuned and that may be 2, for example, and with T being a threshold which may be introduced to upper bound this distance in order to alleviate an influence of outliers. Then, a non-linear optimization algorithm may be used to seek the calibration values CV that minimize the above cost function, wherein the calibration values CV may be given as $$\theta^* = \arg\min C(\theta)$$

From this optimization, a set of improved calibration values $\theta^*$ may be determined, $\theta^*$ may be an improved calibration value CV which may be further improved with the next iteration.

Alternatively, the Fréchet distance may be used for determining the difference between the imaged solid object interface and the real solid object interface.

The calibration values CV may be determined by adjusting predetermined calibration values of the camera 24 such that the difference is reduced, e.g. minimized. The predetermined calibration values may be stored on the memory of the system for calibrating the camera 24. The predetermined calibration values may be stored on the memory by a manufacturer of the system. Alternatively or additionally, the predetermined calibration values may be the final calibration values CV determined by the last calibration of the camera 24 or may be "best guess" calibration values.

The calibration values CV may be adjusted until a predetermined condition is fulfilled. In other words, the above method may be repeatedly carried out until the predetermined condition is fulfilled. For each loop of the method, a new image 40 may be captured by the camera 24 and received by the system for calibrating the camera 24, a new imaged solid object interface may be extracted from the image 40, and a corresponding new real solid object interface may be extracted from the reference data RD. The predetermined condition may be that the difference is smaller than a predetermined difference threshold.

FIG. 6 illustrates a principle for determining parts of the estimated vessel-water interface which are visible from the camera 24, i.e., a visible vessel-water interface 74, and which are shown in FIG. 6 by a continuous line. The camera 24 is arranged on the ego vessel 70. The camera 24 has a field of view 72 in which the estimated real vessel-water interface 64 is located, wherein the field of view 72 may be larger than depicted in FIG. 6, in particular larger than the estimated real vessel-water interface 64. As may be seen from FIG. 6, the visible vessel-water interface 74 is visible from the camera 24, whereas the rest of the estimated real vessel-water interface 64 (dashed line) is not visible from the camera 24. Therefore, the visible vessel-water interface 74 may be used for determining the calibration values CV only. Numerical methods may be used to distinguish between the visible vessel-water interface 74 and the rest of the vessel-water interface. For example, one may define points on the whole vessel-water interface and line segments that connect the points to the camera center. Then, the points of the vessel-water interface with the associated line segments that do not intersect other parts of the vessel-water interface belong to the visible vessel-water interface 74. The visible vessel-water interface 74 may be determined by ray casting.

The neural networks and components mentioned above, e.g. the first neural network, the acquisition component 26, the extracting component 28, and/or the calibration loop 30, each may be implemented by software, hardware, or a combination of software and hardware.

While the present disclosure has been illustrated and described in detail in the drawings and foregoing description, such illustration and description are to be considered illustrative or exemplary and not restrictive; the present disclosure is not limited to the disclosed embodiments. Other variations to the disclosed embodiments can be understood and effected by those skilled in the art and practicing the present disclosure, from a study of the drawings, the disclosure, and the appended claims. In the claims, the word "comprising" does not exclude other elements, and the indefinite article "a" or "an" does not exclude a plurality. A single processing unit or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The disclosed systems and methods are not limited to the specific embodiments described herein. Rather, components of the systems or aspects of the methods may be utilized independently and separately from other described components or aspects.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

The invention claimed is:

1. A method for calibrating a camera which is arranged on an ego vessel, the method comprising:
   receiving image data of an image captured by the camera, the image showing at least one imaged solid object and at least one imaged solid object interface between the imaged solid object and the imaged sky, or between the imaged solid object and an imaged water surface of a waterbody, on which the ego vessel sails;
   extracting the imaged solid object interface from the image data;

determining a pose of the ego vessel at the time at which the image is captured;

receiving reference data, wherein the reference data is representative of at least one real solid object interface corresponding to the imaged solid object interface in the image, and wherein the real solid object interface is between the corresponding real solid object and the real sky or, respectively, between the corresponding real solid object and the corresponding real water surface of the waterbody;

extracting the real solid object interface from the reference data;

determining a difference between the extracted imaged solid object interface and the extracted real solid object interface based on the determined pose of the ego vessel; and determining calibration values for the camera based on the difference such that the difference is reduced.

2. The method in accordance with claim 1, wherein:

the extracting of the imaged solid object interface from the image comprises extracting a pathway of the imaged solid object interface within the image;

the extracting of the real solid object interface from the reference data comprises extracting a pathway of the real solid object interface from the reference data; and the difference between the imaged solid object interface and the real solid object interface corresponds to a difference between the pathway of the imaged solid object interface and the pathway of the real solid object interface.

3. The method in accordance with claim 1, wherein:

when extracting the real solid object interface from the reference data, only those parts of the real solid object interface which are visible from the camera are extracted; and the determining of the difference between the imaged solid object interface and the real solid object interface comprises determining the difference between the imaged solid object interface with the extracted visible parts of the real solid object interface only.

4. The method in accordance with claim 1, wherein;

the reference data comprise two-dimensional (2D) map data representing a 2D map of surroundings of the ego vessel.

5. The method in accordance with claim 1, wherein:

the reference data comprise Automatic Identification System (AIS) data relating to at least one other vessel in the waterbody.

6. The method in accordance with claim 1, wherein:

the reference data comprise elevation map data of the real land abutting on the waterbody.

7. The method in accordance with claim 1, wherein:

the calibration values are adjusted until a predetermined condition is fulfilled.

8. The method in accordance with claim 1, wherein;

the calibration values are determined by adjusting predetermined calibration values of the camera such that the difference is reduced.

9. The method in accordance with claim 2, wherein:

the determining of the difference between the pathway of the imaged solid object interface and the pathway of the real solid object interface comprises transferring the pathway of the imaged solid object interface into the same coordinate system, and determining a misfit function between the imaged solid object interface and the real solid object interface within the coordinate system as the difference; and the determining of the calibration values of the camera such that the difference is reduced comprises determining the calibration values such that the misfit function is reduced.

10. The method in accordance with claim 2, wherein:

the determining of the difference between the pathway of the imaged solid object interface and the pathway of the real solid object interface comprises transferring the pathway of the real solid object interface into the same coordinate system, and determining a misfit function between the imaged solid object interface and the real solid object interface within the coordinate system as the difference; and the determining of the calibration values of the camera such that the difference is reduced comprises determining the calibration values such that the misfit function is reduced.

11. The method in accordance with claim 9, wherein:

the predetermined calibration values are varied such that the misfit function is minimized.

12. The method in accordance with claim 3, comprising:

determining a positional relationship between the camera and the real solid object interface from the reference data; and determining the parts of the real solid object interface which are visible from the camera based on the determined positional relationship.

13. The method in accordance with claim 12, wherein:

the AIS data comprise a geo-location of a Global Positioning System (GPS) receiver of the other vessel and an extent of the other vessel in relation to the geo-location of the GPS receiver of the other vessel;

a real vessel-water interface between the real water surface and the other vessel is estimated from the extent and the geo-location of the GPS receiver of the other vessel;

the parts of the real vessel-water interface which are visible from the camera are determined based on the estimated real vessel-water interface and a position of the camera; and the visible parts of the real vessel-water interface are used as the real solid object interface to compare to the corresponding imaged solid object interface.

14. The method in accordance with claim 12, wherein:

the parts of the real solid object interface which are visible from the camera are determined from the elevation map data by generating a textureless rendered image and by extracting the parts from the textureless rendered image.

15. The method in accordance with claim 4, wherein;

the parts of the real solid object interface which are visible from the camera are determined from the 2D map data based on a determined positional relationship between the camera and the real solid object interface by ray casting.

16. A system for calibrating a camera which is arranged on an ego vessel, the system comprising a memory configured to store reference data and/or calibration values and a processing unit which is configured to:

receive image data of an image captured by the camera, the image showing at least one imaged solid object and at least one imaged solid object interface between the imaged solid object and the imaged sky, or between the imaged solid object and an imaged water surface of a waterbody, on which the ego vessel sails;

extract the imaged solid object interface from the image data;

determine a pose of the ego vessel at the time at which the image is captured;

receive reference data, wherein the reference data is representative of at least one real solid object interface corresponding to the imaged solid object interface in the image, and wherein the real solid object interface is between the corresponding real solid object and the real sky or, respectively, between the corresponding real solid object and the corresponding real water surface of the waterbody;

extract the real solid object interface from the reference data;

determine a difference between the extracted imaged solid object interface and the extracted real solid object interface based on the determined pose of the ego vessel; and determine calibration values for the camera based on the difference such that the difference is reduced.

\* \* \* \* \*